US007481438B2

(12) United States Patent
Hernandez

(10) Patent No.: US 7,481,438 B2
(45) Date of Patent: Jan. 27, 2009

(54) MULTI-POSITION MECHANIC'S CREEPER WITH TOOL TRAY

(75) Inventor: Hector Ray Hernandez, Fullerton, CA (US)

(73) Assignee: Alltrade Tools, LLC, Long Beach, CA (US)

( * ) Notice: Subject to any disclaimer, the term of this patent is extended or adjusted under 35 U.S.C. 154(b) by 212 days.

(21) Appl. No.: 11/487,888

(22) Filed: Jul. 17, 2006

(65) Prior Publication Data

US 2008/0012252 A1 Jan. 17, 2008

(51) Int. Cl.
*B25H 5/00* (2006.01)
*B62B 11/00* (2006.01)

(52) U.S. Cl. .................................... 280/32.6; 280/32.5

(58) Field of Classification Search ............... 280/32.5, 280/32.6; 297/118
See application file for complete search history.

(56) References Cited

U.S. PATENT DOCUMENTS

| | | | | |
|---|---|---|---|---|
| 546,993 | A | | 10/1895 | Bigalow |
| 781,243 | A | | 1/1905 | Thompson |
| 1,149,407 | A | | 8/1915 | Power |
| 1,209,447 | A | | 12/1916 | Johnson |
| 1,218,519 | A | | 3/1917 | Bradley |
| 1,226,585 | A | | 5/1917 | Parker et al. |
| 1,302,301 | A | | 4/1919 | Broome |
| 1,349,941 | A | | 8/1920 | Broome |
| 1,363,023 | A | | 12/1920 | Taylor |
| 1,394,493 | A | | 10/1921 | Grazer |
| 1,511,943 | A | | 10/1924 | Bush |
| 1,643,268 | A | | 9/1927 | Burnwatt |
| 2,054,598 | A | | 9/1936 | Goldenberg |
| 2,430,662 | A | * | 11/1947 | Barton ...................... 280/32.6 |
| 2,509,934 | A | | 5/1950 | Murray |
| 2,611,417 | A | | 9/1952 | Henry et al. |
| 2,692,636 | A | | 10/1954 | Morrison |
| 3,148,892 | A | * | 9/1964 | Merriott .................... 280/32.6 |
| 3,709,487 | A | * | 1/1973 | Walker ....................... 482/133 |
| 3,799,566 | A | | 3/1974 | Thompson |
| 3,984,116 | A | | 10/1976 | Bowers |
| 4,352,597 | A | | 10/1982 | Kay |
| 4,366,599 | A | | 1/1983 | Zimmer et al. |
| D270,962 | S | | 10/1983 | Martell |
| 4,486,919 | A | | 12/1984 | Schoenke |
| 4,580,799 | A | | 4/1986 | Quinonez |
| 4,719,665 | A | | 1/1988 | Bell |
| 4,742,586 | A | | 5/1988 | Galumbeck |
| 4,889,352 | A | | 12/1989 | Chamberlin, Jr. et al. |
| 4,928,350 | A | | 5/1990 | Morgan |
| 5,022,670 | A | | 6/1991 | Cote et al. |
| 5,108,118 | A | | 4/1992 | Schaevitz |
| 5,158,503 | A | | 10/1992 | Mitchell |
| 5,174,592 | A | | 12/1992 | Pool |
| 5,195,763 | A | | 3/1993 | Scott et al. |
| 5,217,315 | A | | 6/1993 | Rosane |
| 5,251,359 | A | | 10/1993 | Finkl |

(Continued)

*Primary Examiner*—Christopher P Ellis
*Assistant Examiner*—Vaughn T Coolman
(74) *Attorney, Agent, or Firm*—Steptoe & Johnson LLP

(57) ABSTRACT

A multi-position creeper has multiple seating positions including a supine configuration, an inclined seating configuration and an upright seating configuration. The creeper includes a frame having a first support frame, a second support frame and a third support frame. A locking mechanism is utilized to pivotally lock the first and second support frames together. A coupling assembly is used to connect the second and third support frames together.

16 Claims, 6 Drawing Sheets

U.S. PATENT DOCUMENTS

| | | | | | |
|---|---|---|---|---|---|
| 5,261,725 | A | * | 11/1993 | Rudolph | 297/361.1 |
| 5,297,809 | A | | 3/1994 | Chen | |
| 5,330,209 | A | | 7/1994 | Pool | |
| 5,413,544 | A | * | 5/1995 | Fiore | 482/68 |
| 5,451,068 | A | | 9/1995 | Shockley | |
| 5,494,305 | A | | 2/1996 | Chen | |
| 5,611,552 | A | | 3/1997 | Miles et al. | |
| 5,622,404 | A | | 4/1997 | Menne | |
| RE35,732 | E | | 2/1998 | Shockley | |
| 5,730,449 | A | | 3/1998 | Miles | |
| D398,124 | S | * | 9/1998 | Schultz et al. | D34/23 |
| D401,029 | S | | 11/1998 | Taylor | |
| 5,857,683 | A | | 1/1999 | Auel | |
| 5,863,053 | A | | 1/1999 | Berry | |
| D406,432 | S | | 3/1999 | Taylor et al. | |
| D406,433 | S | | 3/1999 | Taylor et al. | |
| D406,683 | S | | 3/1999 | Taylor et al. | |
| 5,895,062 | A | | 4/1999 | Miles et al. | |
| 5,947,489 | A | | 9/1999 | Tucker | |
| 6,059,298 | A | | 5/2000 | Tucker | |
| 6,095,532 | A | | 8/2000 | Martin | |
| 6,199,877 | B1 | | 3/2001 | Shockley | |
| RE37,372 | E | * | 9/2001 | Smith | 280/32.6 |
| 6,398,234 | B1 | * | 6/2002 | Brown | 280/32.6 |
| 6,425,590 | B1 | * | 7/2002 | Whiteside et al. | 280/32.6 |
| 6,578,857 | B1 | * | 6/2003 | Whiteside et al. | 280/32.6 |
| 6,702,305 | B2 | | 3/2004 | Miles | |
| 6,705,622 | B2 | | 3/2004 | Whiteside | |
| 6,834,868 | B1 | | 12/2004 | Blackburn | |
| 6,966,564 | B2 | | 11/2005 | Hernandez, Jr. | |
| 6,969,077 | B2 | | 11/2005 | Liu | |
| 7,293,783 | B2 | * | 11/2007 | Whiteside et al. | 280/32.6 |
| 2003/0168824 | A1 | * | 9/2003 | Miles | 280/32.6 |
| 2004/0227313 | A1 | | 11/2004 | Shockley | |

* cited by examiner

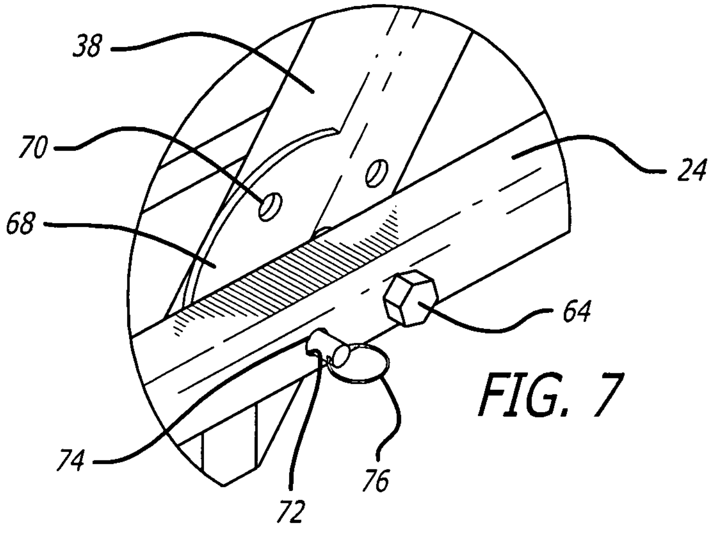
FIG. 7
FIG. 8
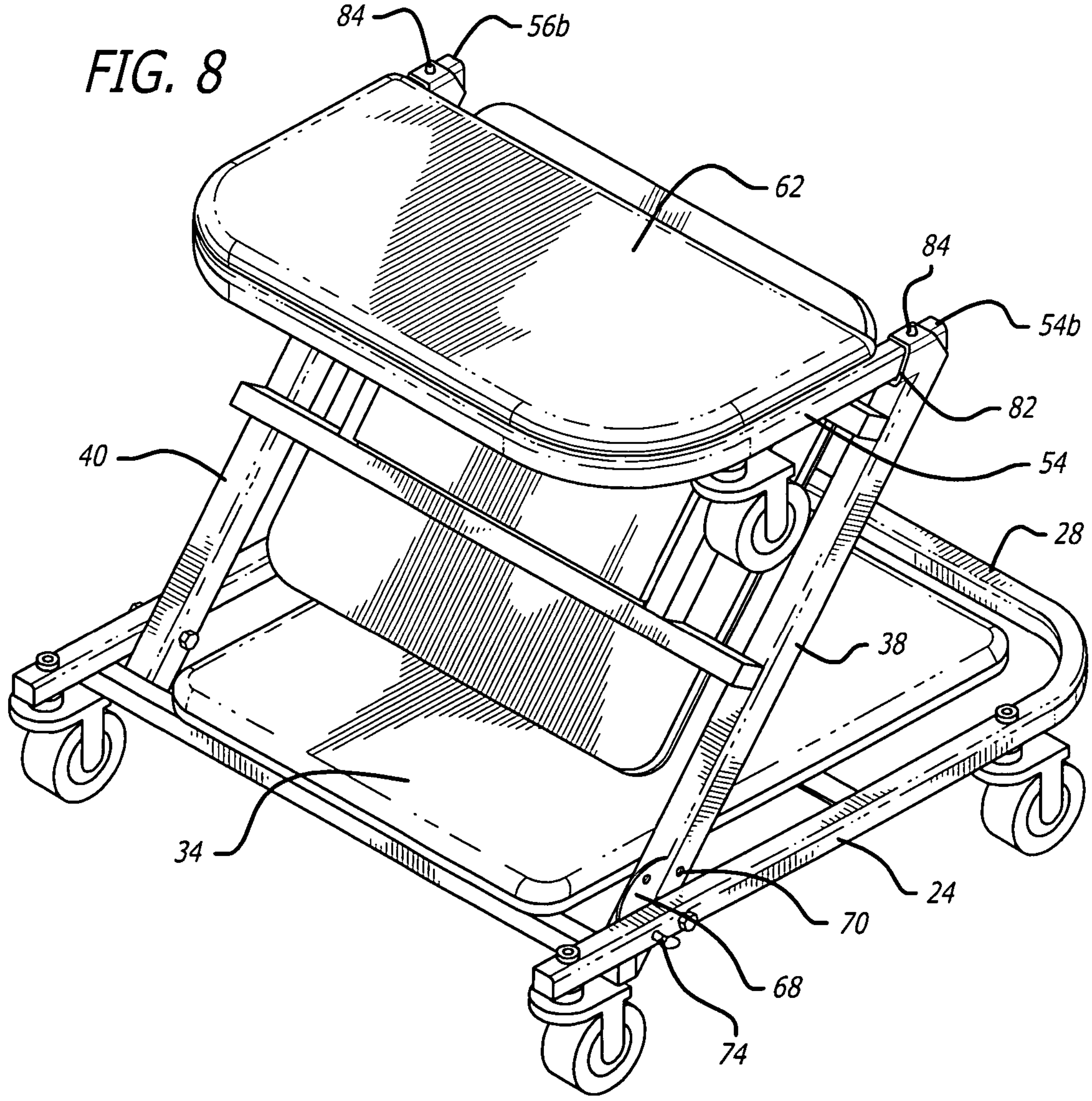

MULTI-POSITION MECHANIC'S CREEPER WITH TOOL TRAY

BACKGROUND OF THE INVENTION

The present invention relates to creepers, such as an automotive mechanic's creeper, and more particularly, to a creeper that is transformable between a number of seating configurations, including a supine configuration, an inclined seating configuration and an upright seating configuration.

In the field of automechanics, a mechanic is often required to work on the underside of a vehicle while performing maintenance or repair. Devices called creepers are widely used to mobilize a mechanic while working under a vehicle. Creepers generally allow the mechanic to move freely in a supine position and work underneath the vehicle while allowing for a minimal clearance under the vehicle. Creepers generally include a flat platform mounted on wheels or casters.

Creepers have been developed which allow the flat platform of the creeper to be transformed into a "rolling seat" for working around the vehicle's exterior, rather than just underneath the vehicle's chassis. These mechanic's creepers allow the mechanic to sit on the creeper in an upright position when working on portions of the vehicle, such as the wheels or doors. Such a mechanic's creeper thus provides two separate work platforms for the mechanic, instead of one, which can decrease the expense in maintaining two separate creepers. Additionally, these mechanic's creepers are usually foldable, thus allowing the creeper to be into collapsed into a compact closed position which can be easily stored around the work area.

While these transformable mechanic's creepers eliminate the need to have two separate creepers, they generally create a raised, upright seating position which, for some maintenance and repair work, places the mechanic's upper torso a bit too high in relation to the work area. Generally, the upright seating position creates a "stool on wheels" and provides no back support for the mechanic when performing the work. As a result, the mechanic often is required to bend forward in a hunched position when sitting on the creeper which can lead to backache and fatigue.

Accordingly, what is needed is a mechanic's creeper which addresses the shortcoming of prior art creepers and which provides the mechanic with an easily transformable mechanic's creeper that can be moved into various seating configurations with minimal effort. The present invention satisfies these and other needs.

SUMMARY OF THE INVENTION

Briefly, and in general terms, the present invention is directed towards a foldable mechanic's creeper which is transformable into a number of usable seating configurations. The multi-position creeper includes a composite frame made from a first support frame, a second support frame and a third support frame. The first support frame is designed to be pivotally connected to the second support frame. The second and third support frames are, in turn, connected together. The connection of these first, second and third support frames allows the composite frame to be folded into a number of usable seating configurations which provide the mechanic with different features.

The first configuration is the well-known supine configuration in which the frame remains substantially horizontal to allow the mechanic to lie in a supine position while working underneath the vehicle. The support frames can be moved into a second seating configuration, referred to as the inclined seating configuration, in which the first support frame remains substantially horizontal on the ground with the second and third support members remaining substantially in a common plane and placed at an inclined angle with respect to the first support frame. This seating configuration creates a reclining chair for the mechanic's use which places the mechanic's torso close to the ground in an upright, position. In this configuration, the creeper can be transformed into an inclined chair which allows the mechanic to sit in a comfortable work position while providing the mechanic with needed back support. Lastly, the mechanic's creeper of the present invention can also be placed in an upright seating configuration in which the first support frame remains on the ground while the third support frame forms a small seating area for the mechanic. In this configuration, the third support frame remains elevated above the ground to allow the mechanic to assume a higher and more upright position when working on various portions of the vehicle. The second support frame acts as a supporting brace which maintains the third support frame raised above the ground.

In one aspect of the present invention, the multi-position creeper can be placed in the inclined seating configuration and set to a number of different inclined angles to allow the mechanic to adjust the creeper so that the back support is placed at a desired angle. A locking mechanism can be utilized which locks the first and second support frames into the desired angle of inclination. This locking mechanism allows the mechanic to quickly and easily unlock the mechanism to allow the mechanic to move the support frames into the desired angle of incline.

In another aspect of the present invention, the second and third support frames can be attached to each other to quickly and easily move the creeper into the upright seating configuration. In the upright seating configuration, the third support frame generally extends directly over the first support frame which provides the base support on the ground. This allows the mechanic to place all of his weight on the third support frame without the fear of tipping. In another aspect of the present invention, the creeper include a locking joint assembly which allows the third support frame to be held in at least two different positions with respect to the second support frame. This allows the mechanic to easily move the third support frame into the horizontal position when placing the creeper into the upright seating configuration.

In another aspect of the present invention, this locking joint assembly can be configured such that the third support frame is temporarily disconnected from the second support frame when moving the creeper between the inclined seating configuration and the upright seating configuration. In this regard, this simple locking structure allows the mechanic to easily remove the third support frame from the locking joint assembly into a different locking position on the second support frame which in turn locks the third support frame in the upright seating configuration.

Other features and advantages of the present invention will become apparent from the following detailed description, taking in conjunction with the accompanying drawings, which illustrate, by way of example, the principals of the present invention.

BRIEF DESCRIPTION OF THE DRAWINGS

FIG. 7 is a perspective view, depicting the multi-position creeper of FIG. 1 folded to define an upright seating configuration, with the third support frame being disposed to be used as a seat portion; and FIG. 8 is an perspective view, partially exploded, depicting the removable third support frame of the multi-position creeper of FIG. 7

DETAILED DESCRIPTION OF THE PREFERRED EMBODIMENTS

Figure 1:
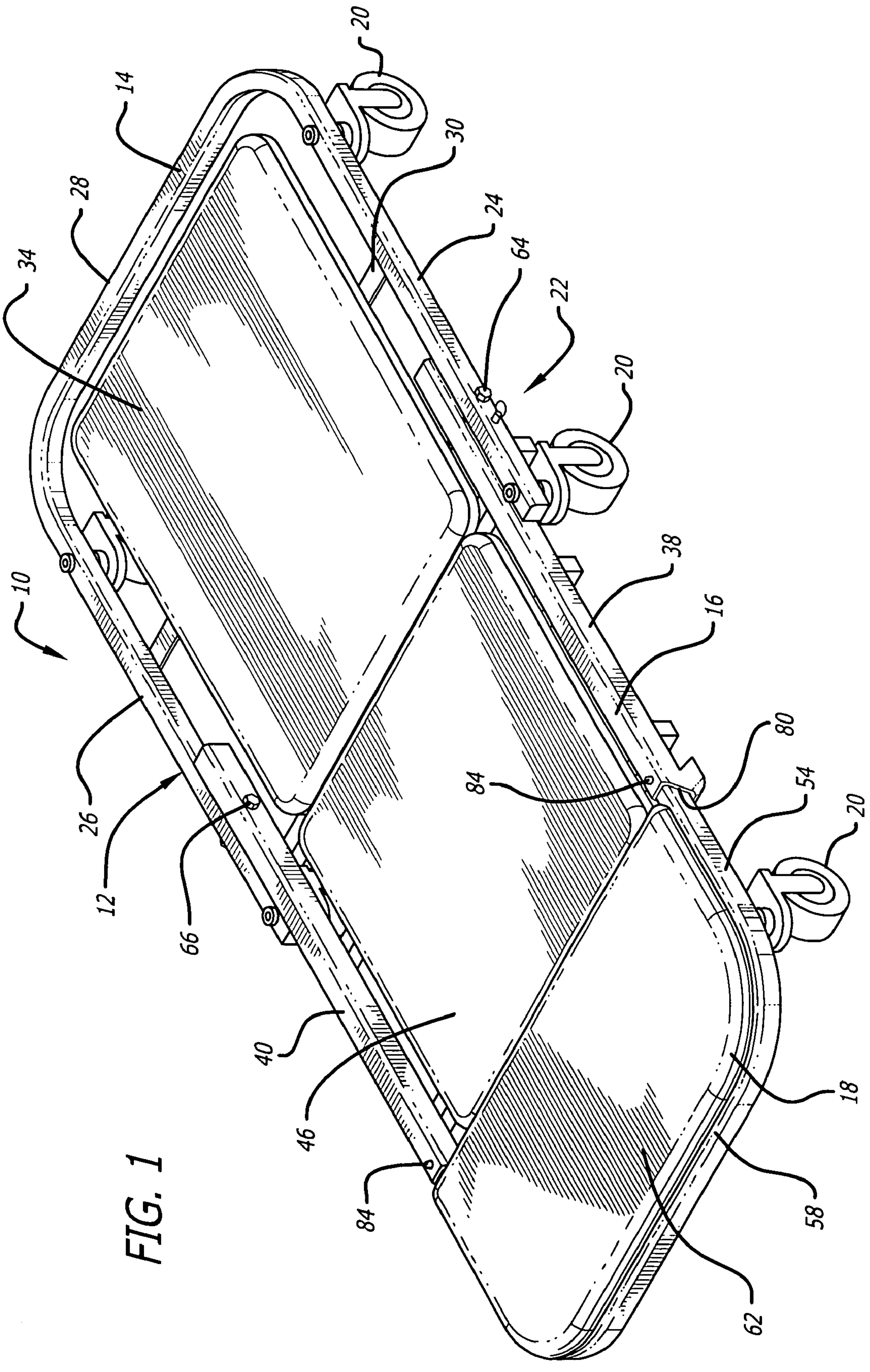
FIG. 1 is a perspective view, depicting a multi-position creeper of the present invention in a horizontal supine configuration.

Referring now to the drawings which are provided by way of example and not limitation, the present invention is embodied in a multi-position mechanic's creeper. In one aspect, the creeper includes a frame made from three (3) subframes which facilitate the folding and unfolding of the composite frame to achieve the various seating configurations attainable by the present invention.

With reference to FIG. 1, the multi-position mechanic's creeper 10 of the present invention includes a composite frame 12 made from a first support frame 14, a second support frame 16 and a third support frame 18. The first, second and third support frames 14, 16 and 18 are connected to each other to allow the creeper 10 to be folded into a number of different seating configurations. Referring initially to FIG. 1, the creeper 10 is shown placed in the supine configuration which allows the mechanic to work on the underside of a vehicle. In this arrangement, the first, second and third support frames 14, 16, 18 remain generally in a common horizontal plane which creates a flat surface for the mechanic to recline upon. Numerous wheels 20 are attached to the frame 12 to allow the mechanic to roll freely about while allowing for minimal clearance under the vehicle.

Figure 5:
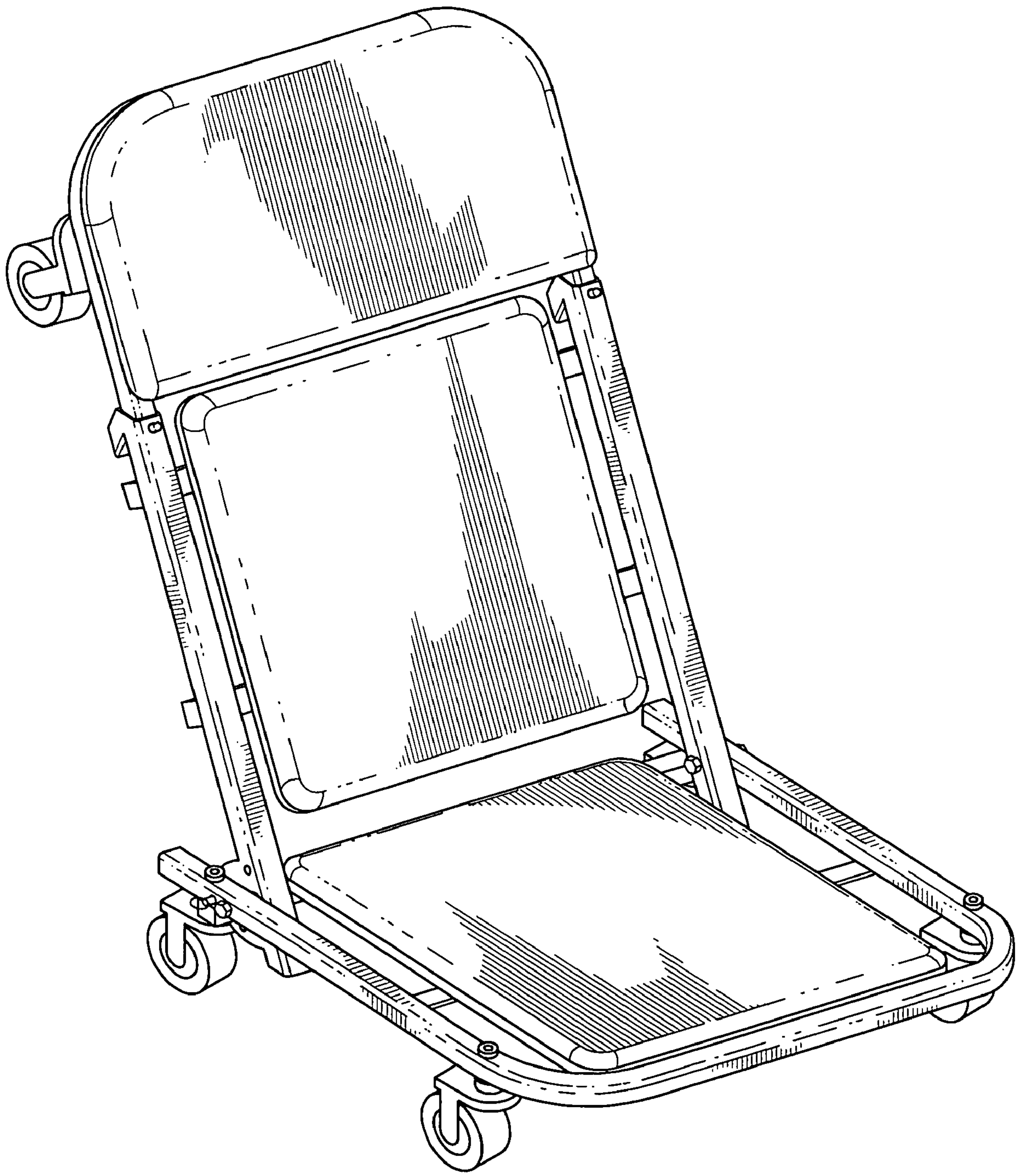
FIG. 5 is a perspective view, depicting the multi-position creeper of FIG. 1 folded to define an inclined seat configuration.

Referring now to FIG. 5, the creeper 10 is shown with the first support frame 14 maintained on the ground and acting as a chair support with the second and third support frames 16, 18 moved into an inclined relationship with the first support frame 14 to form a backrest. FIG. 5 shows the creeper 10 in the inclined seating position which allows the mechanic to sit at a very low position on the ground while providing back support via the second and third support frames 16, 18. Since the first support frame 14 rests directly on the ground, the torso of the mechanic will remain quite low but will provide the mechanic with needed back support while working on the vehicle. This particular configuration is particularly advantageous when the mechanic is working on the wheels or brakes of the vehicle. The inclined seating configuration shown in FIG. 5 can be varied to a number of different incline angles between the first support frame 14 and the composite back support created by the second and third support frames 16, 18. In this regard, a locking mechanism 22 is used to maintain the particular angle of inclination between the first support frame 14 and the second and third support frames 16, 18. This locking mechanism 22 allows the creeper to achieve a number of different angular settings which allows the back support (the second and third support frames) to be moved, for example, an upright position in which the second and third support frames are substantially at a 90° angle with the first support frame to a slight incline in which the back support is slightly elevated above the ground. The locking mechanism 22 can be manufactured to allow the back support to be tilted to a number of different positions to allow the mechanic to obtain the desired angle of inclination.

FIG. 8 shows the raised upright seating configuration achieved by the present invention in which the third support frame is utilized as a seat portion that is elevated above the ground, directly above the first support frame 14. In this configuration, the second support frame 16 acts as a supporting structure in supporting the third support frame 18 in the substantially horizontal position shown in FIG. 8. In this manner, the mechanic can sit on the third support frame 18 in an elevated, raised position to allow the mechanic to work on other portions of the vehicle. The structure of the first support frame 14 provides the base support needed to allow the creeper 10 to be rolled while the mechanics sits on the third support frame, which now forms the seat portion of the creeper.

Figure 2:
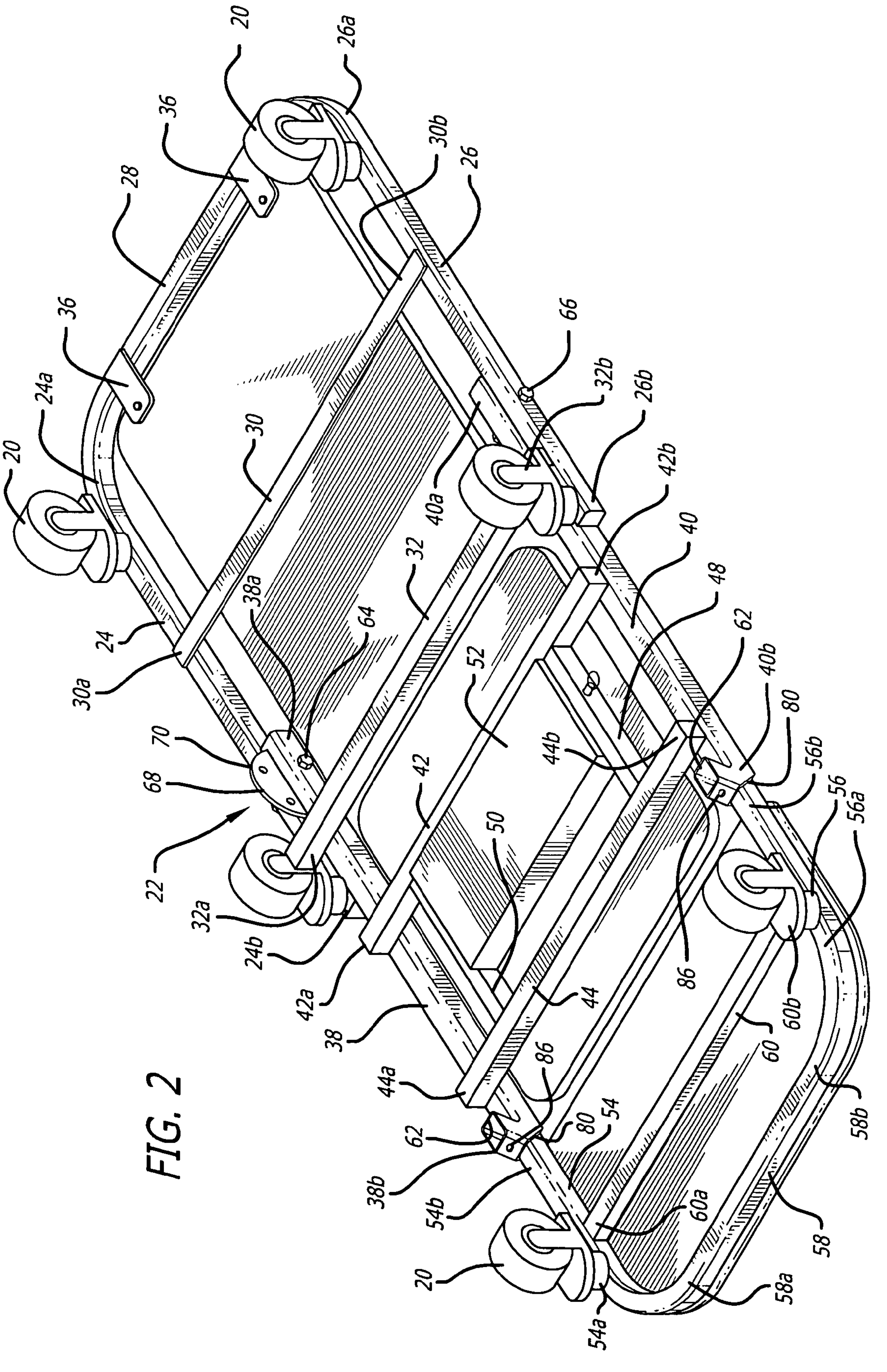
FIG. 2 is a perspective view, depicting the underside of the multi-position creeper of FIG. 1.
Figure 3:
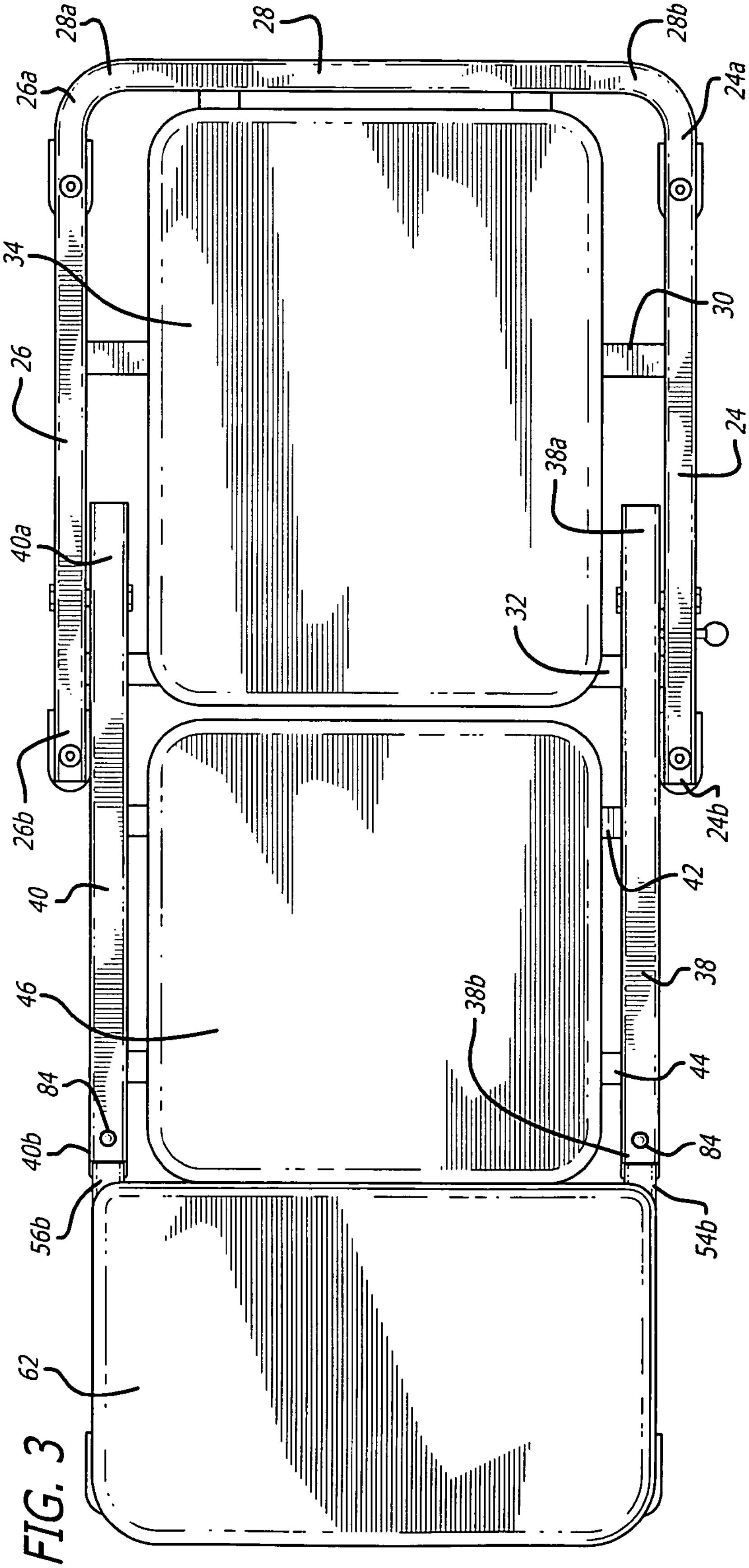
FIG. 3 is a top view, depicting the topside of the multi-position creeper of FIG. 1

The first support frame 14, as shown in FIGS. 1 and 2, comprises a pair of longitudinal frame members 24, 26 and lateral connecting rail members 28, 30, 32 that connect the longitudinal rail members 24, 26 together. The longitudinal rail members 24, 26 each have inner ends 24*a*, 26*a* and outer ends 24*b*, 26*b*, respectively. The cross section of the longitudinal rail members 24, 26 is typically rectangular, but may include other shapes, such as, circular, oval and square.

Figure 4:
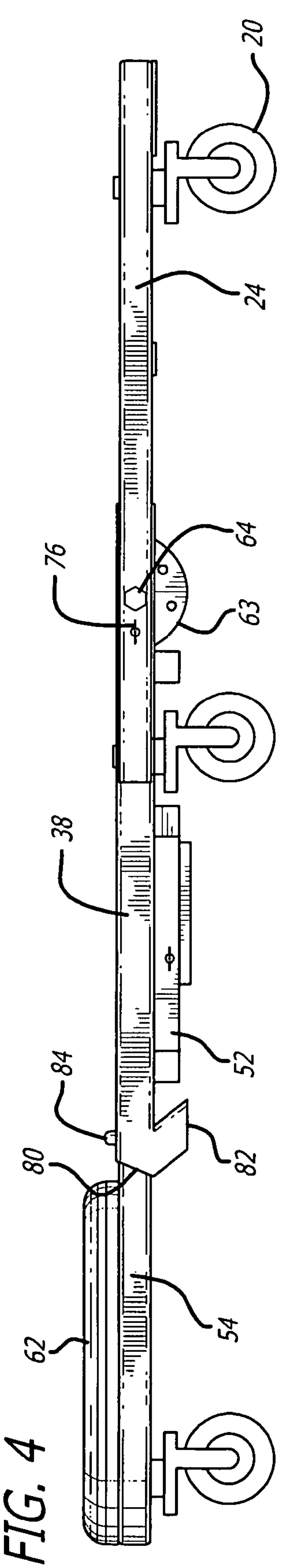
FIG. 4 is side elevation view, depicting the side of the multi-position creeper of FIG. 1.

Each of the lateral rail members 28, 30, 32 includes a pair of ends 28*a*, 28*b*, 30*a*, 30*b* and 32*a* and 32*b*, respectively. As can be seen in FIGS. 1 and 2, the lateral rail member 28 can be made as an integral piece with the longitudinal rail members 24, 26 or can be created as a separate piece, as is shown with the other lateral rail members 30,32, which is welded or otherwise fastened to the longitudinal rail members 24,26. Again, the cross-section of the lateral rail members is typically rectangular, but may be other shapes, such as, circular, oval and square. The placement of the lateral rail members on the longitudinal rail members creates a channel in which a cushion 34 can be placed. In this regard, as can be seen in FIG. 4, the cushion 34 will be substantially flush with the tops of the longitudinal rail members 24, 26. A pair of flanges 36 can also be placed on the underside of the lateral rail member 28 to provide additional support in holding the cushion 34 in place. Additional flanges could be placed along the longitudinal rail members 24, 26 to provide additional supporting structure to the first support frame. A pair of wheels 20 are attached near the inner and outer ends of each of the longitudinal rail members 24, 26.

The second support frame 24 also comprises a pair of outer longitudinal rail members 38, 40 and a pair of lateral connecting rail members 42, 44. Again, each of the longitudinal rail members 38, 40 have an inner end 38*a*, 40*a* and outer end 38*b*, 40*b*, respectively. Each of the lateral rail members 42, 44 include a pair of ends 42*a*, 42*b* and 44*a* and 44*b*, as well. As with the first support frame 14, the second support frame 16 is constructed such that a cushion 46 sits within a channel formed by the longitudinal rail members and lateral rail members. The cross-section of the longitudinal rail members 38,40 and lateral rail members 42, 44 of the second frame support can also be rectangular, but may include other shapes, such as, circular, oval and square.

Attached between the pair of lateral rail members 42, 44 is a second pair of inner longitudinal rail members 48, 50 which create a recess which can be used to house an item, such as a storage box 52, which can be used to hold such items as tools, fasteners and the like. It should be appreciated that other structures beside a storage box 52 could be placed within the recess formed by the inner longitudinal members 48, 50 and the lateral rail members 42, 44.

The third support frame 18 also includes a pair of outer longitudinal rail members 54, 56 and a pair of lateral connecting rail members 58, 60. Each of the longitudinal rail members includes an inner end 54*a*, 56*a* and an outer end 54*b*, 56*b*, respectively. Each of the lateral rail members 54, 60 include a pair of ends 58*a*, 58*b* and 60*a*, 60*b*, respectively. The ends of the lateral rail members are connected to the longitudinal rail members 54, 56 to create the composite third support frame 18. As with the first support frame 14, this third support frame 18 can be constructed such that the longitudinal frame members 54, 56 are formed as a single piece with one of the lateral rail members 58. The other lateral rail member 60 can be welded, fastened or bonded to the each of the longitudinal rail members 54, 56 to create a support for a cushion 62 which, as shown in FIG. 4, extends above the tops of the longitudinal rail members 54, 56 to create a headrest for the mechanic. It should be appreciated that any one of the cushions 34, 46 and 62 could be raised above the top surface of the rail members, if desired. Additionally, the cushion could simply take the form of a panel (without padding) if desired.

Figure 6:
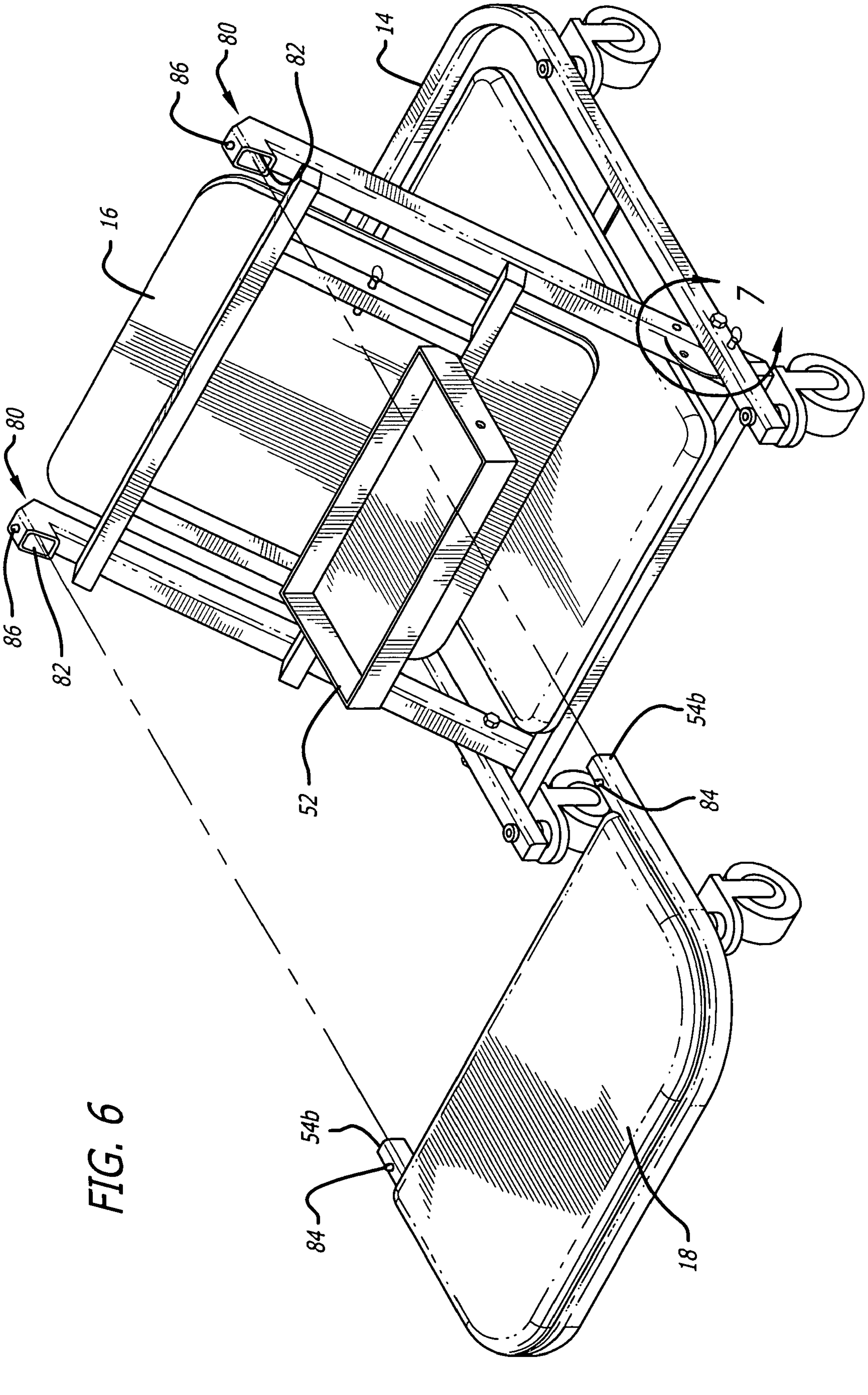
FIG. 6 is an elevation view, depicting a particular type of locking mechanism used to change the angle of incline of the creeper of FIG. 5.

FIGS. 6 and 7 illustrate the connectors 64, 66 that connect the first support frame of 14 to the second support frame 16. These connectors 64, 66 can simply be a nut and bolt assembly which extends through lateral openings in the longitudinal rail members of the first and second support frames 14, 16. In this manner, the first and second support frames 14, 16 will be pivotally connected to each other.

One particular embodiment of a locking mechanism 22 which locks the first support frame 14 relative to the second support frame 16 is shown in FIGS. 6 and 7. In this regard, the locking mechanism easily locks the second support frame 16 at an angle with respect to the first support frame 14 and allows the mechanic to easily move the two support frames 14, 16 to the desired angle of incline. FIG. 7 illustrates a simple plate member 68 which is attached to the longitudinal frame member 38 of the second frame member 16. This plate member 68 may take on a substantial crescent shape, as is shown in FIG. 2, or any functional shape that will perform the function. The plate member 68 includes a plurality of openings 70 located near the outer radius of the plate member 68. These openings 70 are set at desired locations on the plate member 68 in order to achieve different angular angles of incline between the first and second support frames 14, 16. In this regard, as the second frame 16 is pivotally rotated about the connector 64, the various openings 70 will align with a lateral opening 72 formed on the longitudinal rail member 24 of the first support frame 14. This lateral opening 72 on the longitudinal rail member 24 is designed to receive a movable pin 74 which extends through the opening 72 and engages one of the openings 70 found on the plate member 68. The positioning of the openings 70 on the plate member 68 should allow the two openings to align with the opening 72 formed on the rail member 24. This pin 74 may include a spring loaded mechanism (not shown) which keeps the pin 74 biased towards the openings 70 so that the end of the pin 74 will remain engaged within the opening 70. When the mechanic wishes to move the second support frame 16 to a different angular position, he merely needs to grasp the ring 76 attached to the pin 74 and pull the pin 74 out of engagement with the opening 70. Thereafter, the mechanic can simply move the second support frame 16 to a different angular position and the pin 74 should now engage a different opening 70 found on the plate member 68.

Although only one locking mechanism 22 is shown attached to the first and second support frames 14, 16, it should be appreciated that another locking mechanism could be easily installed on the other side of these two support frames to bring additional locking stability to the creeper. Additionally, it should be appreciated to those skilled in the art that this locking mechanism 22 is just one of a number of different locking mechanisms that can be utilized to position and lock the second support frame 16 with respect to the first support frame 14 to obtain the desired angle of incline.

Referring to FIGS. 1 and 6, the coupling assembly used to lock the third support frame 18 to the second support frame 16 is shown. Each of the ends 38*b*, 40*b* of the longitudinal rail members 38, 40 of the second frame member 16 includes a coupling assembly designed to hold and lock the third support frame 18 in place. In the embodiment 78 disclosed in FIGS. 1, 6 and 8, the coupling assembly includes a pair of offset sleeves 77, 78 having openings 80, 82 formed at the ends 38*b*, 40*b* of the longitudinal rail members 38, 40. These openings 80, 82 of the offset sleeves 77, 78 are designed to receive the ends 54*b*, 56*b* of the longitudinal rail members 54, 56 of the third support member. In this manner, the sleeves 77, 78 and openings 80, 82 are sized to receive a corresponding end 54*b*, 56*b* of the longitudinal rail members 54, 56. By mating the ends with the corresponding sleeves, the third support frame 18 will remain coupled to the second support frame 16. Each of the sleeves 77, 78 are offset from each other to allow the third support frame 18 to be placed in a different position relative to the second support frame 16.

As can be best seen in FIG. 6, the longitudinal rail members 54, 56 of the third support frame 18 include exposed ends 54*b*, 56*b* which form an elongate post or engaging element that is adapted to fit within the openings 80, 82 formed on the sleeves 77, 78. Each of the ends 54*b*, 58*b* of the longitudinal rail members fit within an opening 80, 82 which has substantially the same cross-sectional dimension as the ends 54*b*, 56*b*. The ends 54*b*, 56*b* are formed to create a snug fit within the openings 80, 82 and provide the needed support when the third support frame is placed in the upright seating configuration, as is shown in FIG. 8. The structure of the sleeve 77 formed on the second support frame can be simply created from the stock used to manufacture the rail members of the frames. The ends 54*b*, 56*b* of the rails 54, 56 are shown placed in sleeve 77 when the creeper is placed in the supine position and inclined position as is shown in FIGS. 1-5. The ends 54*b*, 56*b* of the rails 54, 56 are shown placed in sleeve 78 when the creeper is placed in the upright seating position as is shown in FIGS. 6 and 8. Since it is possible that there will be heavy loads placed on this coupling assembly 78, some reinforcing material may be needed to increase the overall strength of the sleeves 77, 78.

The ends 54*b*, 56*b* of the longitudinal rails of the third support frame 18 may include simple locking mechanisms, such as detents 84, which are adapted to extend within small openings 86 formed on the ends of the longitudinal rail members of the second support frame 16. FIG. 8 shows how the detents 84 extend within the detent openings 86 formed on the frame. Other detent openings 86 can be formed on the longitudinal rails to accept the detents 84 when the ends 54*b*, 56*b* are placed in opening 80. As can be seen in FIG. 1, this opening 80 receives the ends of the third support frame and maintains it in the supine configuration depicted in FIG. 1. The detents 84 allows the mechanic to quickly remove the third support frame 18 from its locked position, as shown in FIG. 1, so that it can be placed into the second locked position shown in FIG. 8. It should be appreciated that this particular mechanism is just one of the many ways in which the third support frame can be connected to the second support frame 16. Those skilled in the art will recognize that other holding and coupling devices could be utilized which achieve the same function. Additionally, a locking mechanism, such as the plate member 68 and pin 74 described above, could be utilized to connect the third support frame to the second support frame. Also, although the coupling assembly is shown as part of the second support frame, it could just as easily be placed on the end of the rails of the third support frame.

The second support frame 16 provides the support structure in maintaining the third support frame 18 in the upright seating position as is shown in FIG. 8. The second support structure 16 must bear and support the weight of the mechanic as well. In this regard, as shown in FIGS. 6 and 8, the ends 38*a*, 40*a* of the longitudinal rail members 38, 40 are design to contact and bear against the lateral rail member 32 of the first support member 14 when the creeper is in the upright seating position. Therefore, much of the weight will be distributed between the first and second support frames 14, 16. This arrangement of frames also helps to prevent the creeper from tipping in the upright seating position.

The longitudinal rail members and lateral rail members making up the first, second and third support frames can be made from anyone of a number of different materials including steel, aluminum, metal alloys and other suitable metal well known in the art. The various longitudinal rail members and lateral rail members forming the support frames can be connected together utilizing known techniques in the art, such as welding, fasteners such as nuts and bolts, adhesives, and the like.

Thus, it will be apparent from the foregoing that, while particular forms of the invention have been illustrated and described, various modifications can be made without departing from the spirit and scope of the present invention.

I claim:

1. A multi-position creeper, comprising:

a frame including a first support frame, a second support frame pivotally connected to the first support frame, and a third support frame coupled to the second support frame;

wheels attached to the underside of the frame; wherein the frame is movable into a plurality of configurations including:

a supine configuration in which the first, second and third support frames remain substantially horizontal and in a common plane with respect to each other;

an inclined seating configuration in which the first support frame remains substantially horizontal, and the second and third support frames remain substantially in a common plane and are placed at an angle of incline with respect to the first support frame;

an upright seating configuration in which the first support frame remains substantially horizontal, the second support frame is placed at an angle of incline with respect to the first support frame, and the third support frame remains substantially horizontal and at an angle of incline with respect to the second support frame; and a coupling assembly which allows the second and third support frames to be held in at least two different positions with respect to each other;

wherein the third support frame is removable from the coupling assembly to move the third support frame between the inclined seating configuration and the upright seating configuration.

2. The multi-position creeper of claim 1, wherein the second and third support frames can be set to a plurality of angle of incline with respect to the first support frame when the frame is placed in the inclined seating configuration.

3. The multi-position creeper of claim 1, wherein the second and third support frames are lockable with respect to each other when the frame is placed in the inclined seating configuration and upright seating configuration.

4. The multi-position creeper of claim 1, wherein the third support frame is removably coupled to the second support member.

5. The creeper of claim 1, wherein the first and second support frames can be positioned to a plurality of angle of incline with respect to each other.

6. The multi-position creeper of claim 1, including a locking mechanism associated with the first and second support frames which holds and locks the second and third support frames in the inclined seating configuration.

7. The multi-position creeper of claim 6, wherein the locking mechanism allows the first and second support frames to be held at different angles of incline with respect to each other when the frame is in the inclined seating configuration.

8. The multi-position creeper of claim 1, wherein the wheels are attached to the first support frame and third support frame but not the second support frame.

9. The multi-position creeper of claim 8, wherein the wheels attached to the third support frame remain in a downward position when the frame is placed in the upright seating configuration.

10. A multi-position creeper, comprising:

a frame including a first support frame, a second support frame pivotally connected to the first support frame and movable to a plurality of angular positions with respect to the first support frame, and a third support frame coupled to the second support frame and movable to a plurality of locked positions with respect to the second support frame;

a plurality of wheels attached to the underside of the frame;

the frame being movable into a plurality of configurations including:

a supine configuration in which the first, second and third support frames remain substantially horizontal and in a common plane with respect to each other;

an inclined seating configuration in which the first support frame remains substantially horizontal, and the second and third support frames remain substantially in a common plane and are placed at an incline with respect to the first support frame; and an upright seating configuration in which the first support frame remains substantially horizontal, the second support frame is placed at an incline with respect to the first support frame, and the third support frame remains substantially horizontal and is at an incline with respect to the second support frame; and a mechanism for locking the first support frame in one of the angular positions with the second support frame, the mechanism including a plate having a plurality of staggered openings extending there through and a locking pin which is extendable into the openings;

wherein the third support frames includes a plurality of engaging members and the second support frame includes a plurality of sleeves forming receiving openings, each receiving opening adapted to receive one engaging member.

11. The multi-position creeper of claim 10, wherein the plate is attached to the second support frame and the locking pin extends through an opening in the first support frame.

12. A multi-position creeper, comprising:

a frame including a first support frame, a second support frame pivotally connected to the first support frame and movable to a plurality of angular positions with respect to the first support frame, and a third support frame coupled to the second support frame and movable to a plurality of locked positions with respect to the second support frame;

a plurality of wheels attached to the underside of the frame;

wherein the frame is movable into a plurality of configurations including:

a supine configuration in which the first, second and third support frames remain substantially horizontal and in a common plane with respect to each other;

an inclined seating configuration in which the first support frame remains substantially horizontal, and the second and third support frames remain substantially in a common plane and are placed at an incline with respect to the first support frame; and an upright seating configuration in which the first support frame remains substantially horizontal, the second support frame being placed at an angle of incline with respect to the first support frame, and the third support frame remains substantially horizontal and at an angle of incline with respect to the second support frame;

wherein the third support frame is removable from the second support frame to move the third support frame between locked positions.

13. The multi-position creeper of claim 12, wherein the third support frame is disposed over the first support frame when the frame is in the upright seating position.

14. The multi-position creeper of claim 12, wherein the third support frames includes a pair of outwardly projecting ends and the second support frame includes a plurality of sleeves forming receiving openings, each receiving opening adapted to receive one of the outwardly projecting ends of the third support frame.

15. The multi-position creeper of claim 12, wherein the second and third support frames are movable between a plurality of angles of incline with respect to the first support frame when the frame is placed in the inclined seating configuration.

16. The multi-position creeper of claim 12, farther including a mechanism for locking the first support frame in one of the angular positions with the second support frame.

* * * * *